(12) United States Patent
Wu

(10) Patent No.: US 8,026,751 B2
(45) Date of Patent: Sep. 27, 2011

(54) RESET SIGNAL GENERATING CIRCUIT

(75) Inventor: Chun-Te Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/693,356

(22) Filed: Jan. 25, 2010

(65) Prior Publication Data

US 2010/0237912 A1 Sep. 23, 2010

(30) Foreign Application Priority Data

Mar. 19, 2009 (CN) ...................... 2009 2 0301412 U

(51) Int. Cl.
*H03K 3/02* (2006.01)
(52) U.S. Cl. ..................... 327/198; 327/142; 327/143
(58) Field of Classification Search ................. 327/198, 327/142, 143
See application file for complete search history.

(56) References Cited

U.S. PATENT DOCUMENTS

| 5,559,458 | A | | 9/1996 | Holler, Jr. |
| 5,894,240 | A | * | 4/1999 | Shieh et al. ................. 327/142 |
| 6,288,584 | B1 | * | 9/2001 | Wu et al. ..................... 327/143 |
| 6,509,767 | B2 | * | 1/2003 | Tanaka et al. ................ 327/142 |
| 7,164,300 | B2 | * | 1/2007 | Hsu ............................. 327/198 |
| 7,750,684 | B2 | * | 7/2010 | Jurasek et al. ................ 327/47 |
| 2006/0109037 | A1 | * | 5/2006 | Hsu ............................. 327/143 |
| 2007/0152724 | A1 | * | 7/2007 | Chiu et al. ................... 327/198 |

* cited by examiner

*Primary Examiner* — Tuan T Lam
(74) *Attorney, Agent, or Firm* — Altis Law Group, Inc.

(57) ABSTRACT

A reset signal generating circuit for a processor includes a charging circuit, a discharging circuit, and a triggering circuit. The charging circuit receives timing pulse signals from the processor to supply charging current according to the timing pulse signals when the processor operates normally, and stops supplying the charging current when the processor is at fault. The discharging circuit buffers the charging current supplied by the charging circuit when the processor operates normally, and discharges a low voltage to the triggering circuit when the processor is at fault. The triggering circuit outputs a trigger signal to the processor when the triggering circuit detects the low voltage to reset the processor.

7 Claims, 2 Drawing Sheets

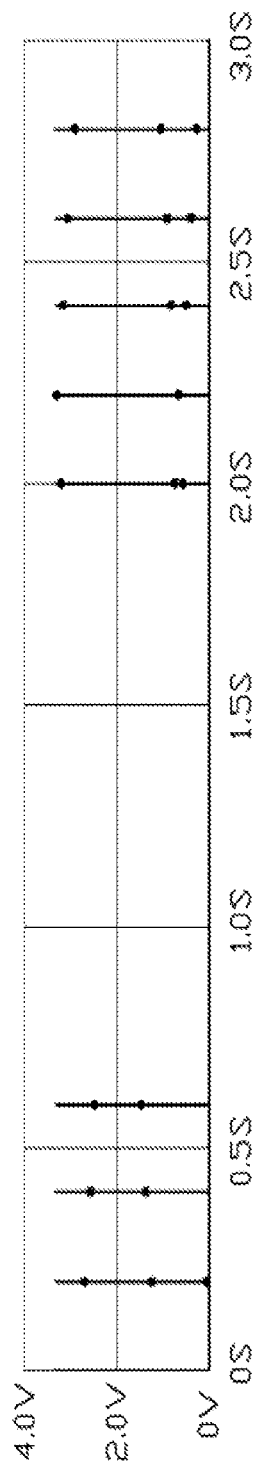
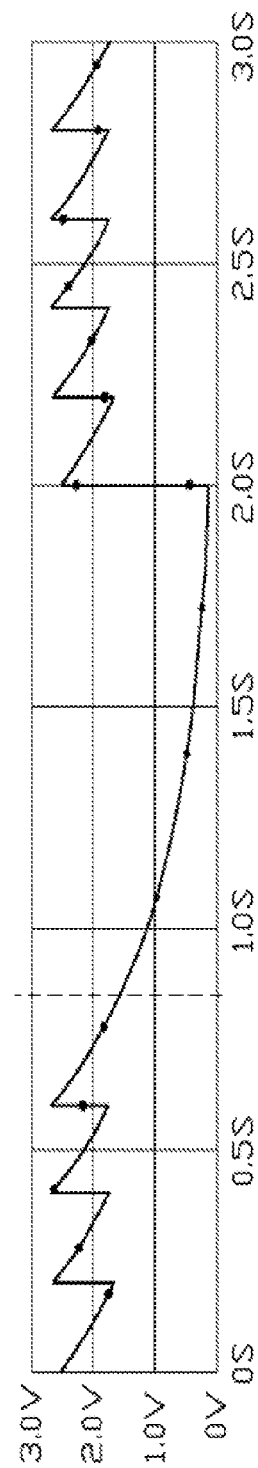
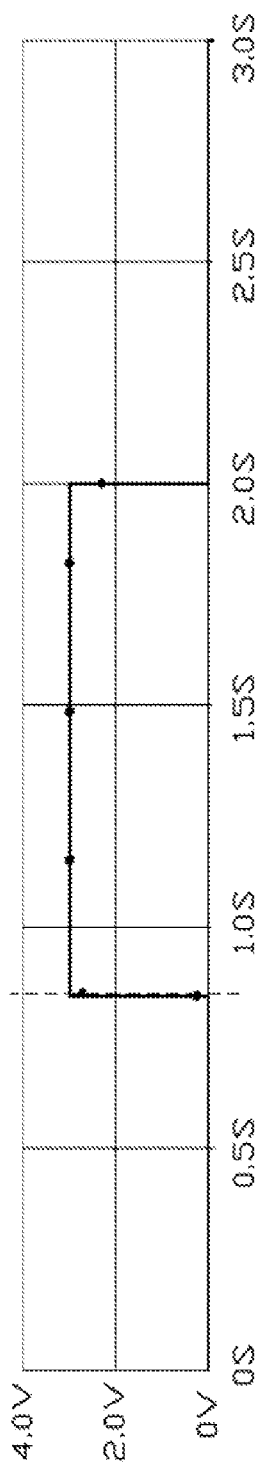
FIG. 2A
FIG. 2B
FIG. 2C

__US 8,026,751 B2__

RESET SIGNAL GENERATING CIRCUIT

BACKGROUND

1. Technical Field

Embodiments of the present disclosure relate to processors, and more particularly to a reset signal generating circuit for a processor.

2. Description of Related Art

Normally, there are two solutions for resetting a processor when the processor is at fault. One solution is to rewrite a timing buffer in the processor periodically and to reset the processor when the rewriting is at fault. Another solution is to employ an integrated circuit to reset the processor. The above-mentioned solutions both require high cost and complex structure. Therefore, a need exists for an electronic device that can overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

FIG. 2A-C are schematic diagrams of signal waves of the reset signal generating circuit in FIG. 1.

DETAILED DESCRIPTION

Figure 1:
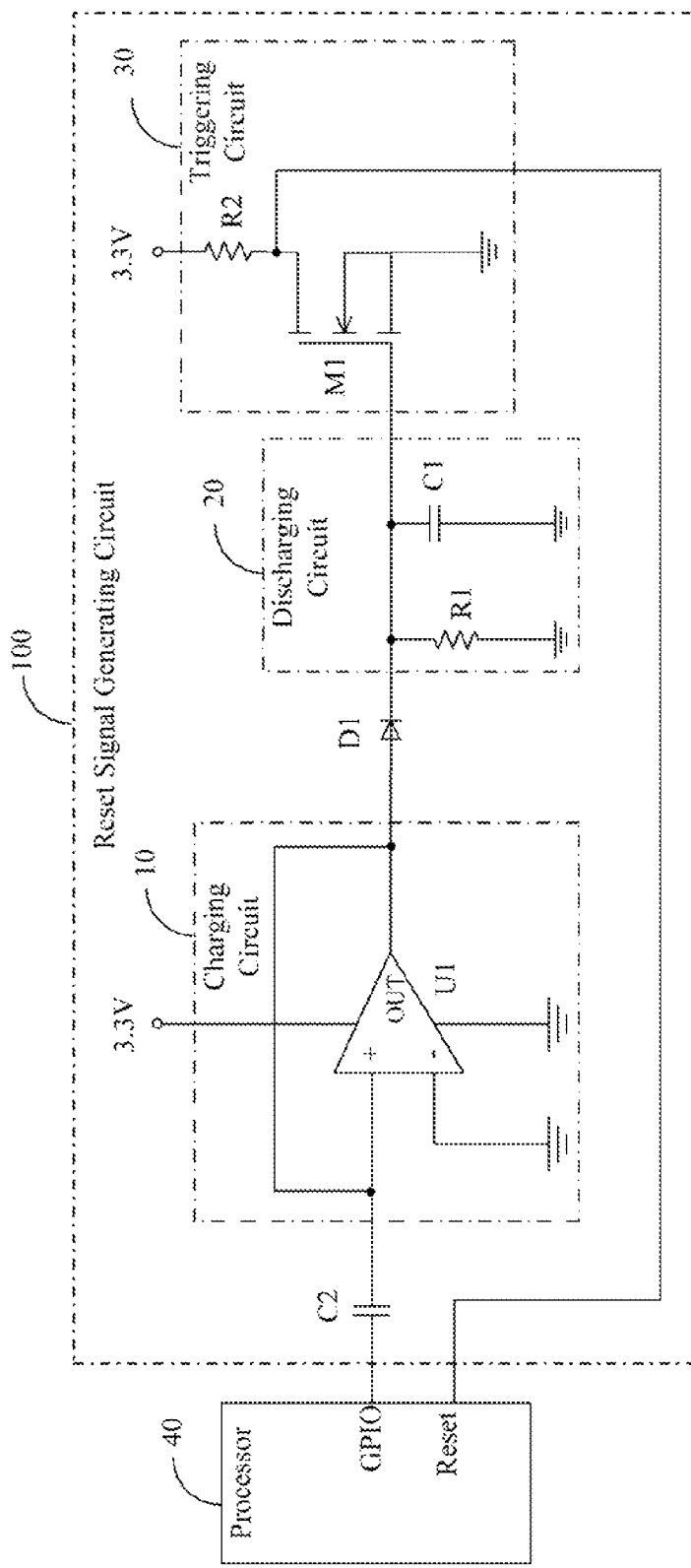
FIG. 1 is a schematic diagram of a reset signal generating circuit of one embodiment of the present disclosure.

FIG. 1 is a schematic diagram of a reset signal generating circuit 100 for a processor 40 of one embodiment of the present disclosure. It should be understood that the processor 40 is the most important part in an electronic device and may result in failure (at fault) because of instability of the hardware and software of the electronic device, such as when power of the electronic device is instable when the operating system of the electronic device boots up. As such, the processor 40 is required to be reset. The reset signal generating circuit 100 generates a trigger signal to reset the processor 40 when the processor 40 is at fault.

In one embodiment, the reset signal generating circuit 100 includes a charging circuit 10, a discharging circuit 20, and a triggering circuit 30. The processor 40 includes a general purpose input output (GPIO) pin and a reset pin. The processor 40 may be a central processing unit (CPU) or a micro control unit (MCU).

In one embodiment, the processor 40 outputs timing pulse signals to the charging circuit 10 by the GPIO pin of the processor 40. The charging circuit 10 receives the timing pulse signals from the GPIO pin of the processor 40 and supplies charging current to the discharging circuit 20 according to the timing pulse signals when the processor 40 operates normally. The charging circuit 10 stops supplying the charging current when the processor 40 is at fault.

In one embodiment, the charging circuit 10 includes an operation amplifier U1. The operation amplifier U1 supplies the charging current to the discharging circuit 20 so as to charge the discharging circuit 20. A non-inverting terminal and an output terminal of the operation amplifier U1 are connected together and further connected to the processor 40. An inverting terminal of the operation amplifier U1 is grounded.

The discharging circuit 20 is connected to the charging circuit 10. The discharging circuit 20 buffers the charging current from the charging circuit 10 when the processor 40 operates normally. The discharging circuit 20 further discharges a low voltage signal when the processor 40 is at fault.

In one embodiment, the discharging circuit 20 includes a first resistor R1 and a first capacitor C1. The first resistor R1 is connected between the output terminal of the operation amplifier U1 and ground. The first capacitor C1 is parallel to the first resistor R1 and is also connected between the output terminal of the operation amplifier U1 and ground. The first capacitor C1 buffers the charging current when the processor 40 operates normally. The first capacitor C1 discharges the low voltage signal to the trigger circuit 30 when the processor 40 is at fault. The first resistor R1 provides a discharge path for the first capacitor C1 and determines a discharge duration of the first capacitor C1.

An input end of the triggering circuit 30 is connected to the discharging circuit 20 to detect the low voltage. The triggering circuit 30 outputs a trigger signal to the processor 40 the triggering circuit 30 detects the low voltage. Subsequently, the processor 40 resets when the processor 40 receives the trigger signal.

In one embodiment, the triggering circuit 30 includes an N-channel metal-oxide-semiconductor field-effect transistor (MOSFET) M1 and a second resistor R2. A gate electrode of the N-channel MOSFET M1 is connected to the first resistor R1 and the first capacitor C1. A source electrode of the N-channel MOSFET M1 is connected to ground. The second resistor R2 is connected between a drain electrode of the N-channel MOSFET M1 and a reference voltage to restrict current of the trigger signal. The drain electrode of the N-channel MOSFET M1 is further connected to the reset pin of the processor 40 to output the trigger signal to the processor.

In other embodiments, the reset signal generating circuit 100 further includes a second capacitor C2 and a diode D1. The second capacitor C2 is connected between the processor 40 and the charging circuit 10. The second capacitor C2 conducts alternating current and blocks direct current from the processor 40 to the charging circuit 10. An anode of the diode D1 is connected to the charging circuit 10 and a cathode of the diode D1 is connected to the discharging circuit 20 so as to prevent the charging circuit 10 from receiving a feed back from the discharging circuit 20.

In one embodiment, the GIPO pin of the processor 40 outputs the pulse signal when the processor 40 operates normally. The second capacitor C2 blocks the direct current of the pulse signal and merely conducts the alternating current of the pulse signal. Subsequently, the operation amplifier U1 receives the timing pulse signals and outputs high voltage signals by connecting a power supply, such as a 3.3 volt (V) external voltage. The first capacitor C1 and the gate electrode of the N-channel MOSFET M1 both receive the high voltage signals. The first capacitor C1 charges. The high voltage signal inputted to the N-channel MOSFET M1 is higher than the threshold voltage of the N-channel MOSFET M1. Therefore, the N-channel MOSFET M1 is on and then conducts the high voltage signal to ground.

In another embodiment, the GIPO pin of the processor 40 stops outputting the timing pulse signals when the processor 40 is at fault. The operation amplifier U1 stops outputting the high voltage signal. As such, the first capacitor C1 discharges the low voltage signal to the N-channel MOSFET M1. The low voltage signal is lower than the threshold voltage of the N-channel MOSFET M1. Therefore, the N-channel MOSFET M1 is off and then outputs a trigger signal to the processor 40 by connecting a power supply, such as a 3.3 volt (V) external voltage. Subsequently, the processor 40 resets.

FIG. 2A-C are schematic diagrams of signal waves of the reset signal generating circuit 100 in FIG. 1. FIG. 2A is a schematic diagram of a signal wave of the first capacitor C1. In one embodiment, the processor 40 outputs the timing pulse signals and charges the first capacitor C1 substantially once every 200 milliseconds when the processor 40 operates normally. Subsequently, the processor 40 stops outputting the timing pulse signals and charging the first capacitor C1 when the processor 40 is at fault. After the processor 40 operates normally, the processor 40 re-charges the first capacitor C1.

FIG. 2B is a schematic diagram of a signal wave of the N-channel MOSFET M1. In one embodiment, the processor 40 outputs the timing pulse signals when the processor 40 operates normally. As such, the voltage inputted to the N-channel MOSFET M1 is higher than the threshold voltage of the N-channel MOSFET M1 and the N-channel MOSFET M1 is on. Subsequently, the processor 40 stops outputting the timing pulse signals when the processor 40 is at fault. Then, the voltage inputted to the N-channel MOSFET M1 is lower than the threshold voltage of the N-channel MOSFET M1. As a result the N-channel MOSFET M1 is off. After the processor 40 operates normally, the N-channel MOSFET M1 is reactivated.

FIG. 2C is a schematic diagram of a signal wave of the trigger signal. In one embodiment, the trigger signal is non-entity when the processor 40 operates normally because the N-channel MOSFET M1 is on and conducts the inputted voltage to ground. Subsequently, the N-channel MOSFET M1 is off and outputs the trigger signal to the processor 40 when the processor 40 is at fault. After the processor 40 operates normally, the N-channel MOSFET M1 is on and re-conducts the inputted voltage to ground.

The reset signal generating circuit 100 of the present disclosure generates the trigger signal by the charging circuit 10, the discharging circuit 20, and the triggering circuit 30, and then outputs the trigger signal to the reset pin of the processor 40 so as to reset the processor 40. The reset signal generating circuit 100 is a processor resetting solution having a low cost and simple structure.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A reset signal generating circuit for a processor, comprising:
    a charging circuit configured and structured to receive timing pulse signals from the processor to supply charging current according to the timing pulse signals when the processor operates normally, and stop supplying the charging current when the processor is at fault;
    a second capacitor connected between the processor and the charging circuit and configured and structured to conduct alternating current and block direct current;
    a discharging circuit connected to the charging circuit, and configured and structured to buffer the charging current supplied by the charging circuit when the processor operates normally, and discharge a low voltage when the processor is at fault; and
    a triggering circuit connected to the discharging circuit, and configured and structured to output a trigger signal to the processor when the triggering circuit detects the low voltage, to reset the processor.

2. The reset signal generating circuit as claimed in claim 1, wherein the charging circuit comprises an operation amplifier, wherein a non-inverting terminal and an output terminal of the operation amplifier are connected together and further connected to the processor, and an inverting terminal of the operation amplifier is grounded.

3. The reset signal generating circuit as claimed in claim 1, wherein the discharging circuit comprises:
    a first resistor connected between the output terminal of the operation amplifier and ground; and
    a first capacitor connected between the output terminal of the operation amplifier and ground, and configured and structured to buffer the charging current or discharge the low voltage to the triggering circuit when not receiving the charging current;
    wherein the first resistor is configured and structured to provide a discharge path for the first capacitor and determine a discharge duration of the first capacitor.

4. The reset signal generating circuit as claimed in claim 3, wherein the triggering circuit comprises:
    an N-channel MOSFET, wherein a gate electrode of the N-channel MOSFET is connected to the first resistor and the first capacitor, a source electrode of the N-channel MOSFET is connected to ground; and
    a second resistor connected between a drain electrode of the N-channel MOSFET and a reference voltage;
    wherein the drain electrode of the N-channel MOSFET is further connected to the processor, and is configured and structured to output the trigger signal to the processor.

5. The reset signal generating circuit as claimed in claim 4, wherein voltage inputted to the N-channel MOSFET is higher than a threshold voltage of the N-channel MOSFET and the N-channel MOSFET is on and conducts the inputted voltage to ground when the processor operates normally.

6. The reset signal generating circuit as claimed in claim 4, wherein the low voltage inputted to the N-channel MOSFET is lower than a threshold voltage of the N-channel MOSFET and the N-channel MOSFET is off and outputs the trigger signal to the processor when the processor is at fault.

7. The reset signal generating circuit as claimed in claim 1, further comprising a diode with an anode connected to the charging circuit and a cathode connected to the discharging circuit, so as to prevent the charging circuit from receiving a feed back from the discharging circuit.

\* \* \* \* \*